U S010146545B2

(12) United States Patent
Segelken et al.

(10) Patent No.: US 10,146,545 B2
(45) Date of Patent: Dec. 4, 2018

(54) TRANSLATION ADDRESS CACHE FOR A MICROPROCESSOR

(75) Inventors: Ross Segelken, Portland, OR (US); Alex Klaiber, Mountain View, CA (US); Nathan Tuck, Corvallis, OR (US); David Dunn, Sammamish, WA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 13/419,323

(22) Filed: Mar. 13, 2012

(65) Prior Publication Data
US 2013/0246709 A1 Sep. 19, 2013

(51) Int. Cl.
*G06F 12/10* (2016.01)
*G06F 9/30* (2018.01)
*G06F 12/1018* (2016.01)
G06F 12/0862 (2016.01)
G06F 9/38 (2018.01)

(52) U.S. Cl.
CPC ...... *G06F 9/30181* (2013.01); *G06F 9/30174* (2013.01); *G06F 12/1018* (2013.01); *G06F 9/3017* (2013.01); *G06F 9/3802* (2013.01); *G06F 12/0862* (2013.01)

(58) Field of Classification Search
CPC .. G06F 12/0875; G06F 9/3808; G06F 9/3017; G06F 12/0862; G06F 12/1027; G06F 12/1018; G06F 9/3802; G06F 9/30047
USPC ............... 711/125, 123, 137, 205, 207, 216
See application file for complete search history.

(56) References Cited

U.S. PATENT DOCUMENTS

| 3,815,101 | A | 6/1974 | Boss et al. |
| 3,950,729 | A | 4/1976 | Fletcher et al. |
| 4,654,790 | A | 3/1987 | Woffinden |
| 4,797,814 | A | 1/1989 | Brenza |

(Continued)

FOREIGN PATENT DOCUMENTS

| CN | 1390329 | 1/2003 |
| CN | 1519728 | 8/2004 |

(Continued)

OTHER PUBLICATIONS

Rotenberg, Eric et al., "Trace Cache: a Low Latency Approach to High Bandwidth Instruction Fetching," Published in the Proceedings of the 29th Annual International Symposium on Microarchitecture, Dec. 2-4, 1996, Paris, France, 12 pages.

(Continued)

*Primary Examiner* — Than Nguyen

(57) ABSTRACT

Embodiments related to fetching instructions and alternate versions achieving the same functionality as the instructions from an instruction cache included in a microprocessor are provided. In one example, a method is provided, comprising, at an example microprocessor, fetching an instruction from an instruction cache. The example method also includes hashing an address for the instruction to determine whether an alternate version of the instruction which achieves the same functionality as the instruction exists. The example method further includes, if hashing results in a determination that such an alternate version exists, aborting fetching of the instruction and retrieving and executing the alternate version.

14 Claims, 5 Drawing Sheets

(56) References Cited

U.S. PATENT DOCUMENTS

| | | |
|---|---|---|
| 4,812,981 A | 3/1989 | Chan et al. |
| 5,123,094 A | 6/1992 | MacDougall |
| 5,179,669 A | 1/1993 | Peters |
| 5,245,702 A | 9/1993 | McIntyre et al. |
| 5,278,962 A | 1/1994 | Masuda et al. |
| 5,414,824 A | 5/1995 | Grochowski |
| 5,446,854 A | 8/1995 | Khalidi et al. |
| 5,487,146 A | 1/1996 | Guttag et al. |
| 5,526,504 A | 6/1996 | Hsu et al. |
| 5,649,102 A | 7/1997 | Yamauchi et al. |
| 5,649,184 A | 7/1997 | Hayashi et al. |
| 5,696,925 A | 12/1997 | Koh |
| 5,721,855 A * | 2/1998 | Hinton ............... G06F 9/30152 711/E12.049 |
| 5,870,582 A | 2/1999 | Cheong et al. |
| 5,949,785 A | 9/1999 | Beasley |
| 5,956,753 A | 9/1999 | Glew et al. |
| 5,963,984 A | 10/1999 | Garibay, Jr. et al. |
| 5,999,189 A | 12/1999 | Kajiya et al. |
| 6,012,132 A | 1/2000 | Yamada et al. |
| 6,031,992 A | 2/2000 | Cmelik et al. |
| 6,091,897 A | 7/2000 | Yates et al. |
| 6,091,987 A | 7/2000 | Thompson |
| 6,118,724 A | 9/2000 | Higginbottom |
| 6,297,832 B1 | 10/2001 | Mizuyabu et al. |
| 6,298,390 B1 | 10/2001 | Matena et al. |
| 6,362,826 B1 | 3/2002 | Doyle et al. |
| 6,457,115 B1 | 9/2002 | McGrath |
| 6,470,428 B1 * | 10/2002 | Milway et al. ............... 711/138 |
| 6,499,090 B1 | 12/2002 | Hill et al. |
| 6,519,694 B2 | 2/2003 | Harris |
| 6,549,997 B2 | 4/2003 | Kalyanasundharam |
| 6,636,223 B1 | 10/2003 | Morein |
| 6,658,538 B2 | 12/2003 | Arimilli et al. |
| 6,711,667 B1 | 3/2004 | Ireton |
| 6,714,904 B1 | 3/2004 | Torvalds et al. |
| 6,742,104 B2 | 5/2004 | Chauvel et al. |
| 6,751,583 B1 | 6/2004 | Clarke et al. |
| 6,813,699 B1 | 11/2004 | Belgard |
| 6,823,433 B1 | 11/2004 | Barnes et al. |
| 6,839,813 B2 | 1/2005 | Chauvel |
| 6,859,208 B1 | 2/2005 | White |
| 6,877,077 B2 | 4/2005 | McGee et al. |
| 6,883,079 B1 | 4/2005 | Priborsky |
| 6,950,925 B1 | 9/2005 | Sander et al. |
| 6,978,462 B1 | 12/2005 | Adler et al. |
| 6,981,083 B2 | 12/2005 | Arimilli et al. |
| 7,007,075 B1 | 2/2006 | Coffey |
| 7,010,648 B2 | 3/2006 | Kadambi et al. |
| 7,062,631 B1 | 6/2006 | Klaiber et al. |
| 7,082,508 B2 | 7/2006 | Khan et al. |
| 7,107,411 B2 | 9/2006 | Burton et al. |
| 7,107,441 B2 | 9/2006 | Zimmer et al. |
| 7,117,330 B1 | 10/2006 | Alverson et al. |
| 7,120,715 B2 | 10/2006 | Chauvel et al. |
| 7,124,327 B2 | 10/2006 | Bennett et al. |
| 7,139,876 B2 | 11/2006 | Hooker |
| 7,159,095 B2 | 1/2007 | Dale et al. |
| 7,162,612 B2 | 1/2007 | Henry et al. |
| 7,191,349 B2 | 3/2007 | Kaushik et al. |
| 7,194,597 B2 | 3/2007 | Willis et al. |
| 7,194,604 B2 | 3/2007 | Bigelow et al. |
| 7,203,932 B1 | 4/2007 | Gaudet et al. |
| 7,225,355 B2 | 5/2007 | Yamazaki et al. |
| 7,234,038 B1 | 6/2007 | Durrant |
| 7,275,246 B1 | 9/2007 | Yates, Jr. et al. |
| 7,310,722 B2 | 12/2007 | Moy et al. |
| 7,340,582 B2 | 3/2008 | Madukkarumukumana et al. |
| 7,340,628 B2 | 3/2008 | Pessolano |
| 7,401,358 B1 | 7/2008 | Christie et al. |
| 7,406,585 B2 | 7/2008 | Rose et al. |
| 7,447,869 B2 | 11/2008 | Kruger et al. |
| 7,519,781 B1 | 4/2009 | Wilt |
| 7,545,382 B2 | 6/2009 | Montrym et al. |
| 7,702,843 B1 | 4/2010 | Chen et al. |
| 7,730,489 B1 | 6/2010 | Duvur et al. |
| 7,752,627 B2 | 7/2010 | Jones et al. |
| 7,873,793 B1 | 1/2011 | Rozas et al. |
| 7,890,735 B2 | 2/2011 | Tran |
| 7,921,300 B2 | 4/2011 | Crispin et al. |
| 7,925,923 B1 | 4/2011 | Hyser et al. |
| 8,035,648 B1 | 10/2011 | Wloka et al. |
| 8,190,863 B2 | 5/2012 | Fossum et al. |
| 8,364,902 B2 | 1/2013 | Hooker et al. |
| 8,533,437 B2 | 9/2013 | Henry et al. |
| 8,549,504 B2 | 10/2013 | Breternitz, Jr. et al. |
| 8,621,120 B2 | 12/2013 | Bender et al. |
| 8,706,975 B1 | 4/2014 | Glasco et al. |
| 8,707,011 B1 | 4/2014 | Glasco et al. |
| 8,762,127 B2 | 6/2014 | Winkel et al. |
| 9,384,001 B2 | 7/2016 | Hertzberg et al. |
| 9,547,602 B2 | 1/2017 | Klaiber et al. |
| 2001/0049818 A1 | 12/2001 | Banerjia et al. |
| 2002/0004823 A1 | 1/2002 | Anderson et al. |
| 2002/0013889 A1 | 1/2002 | Schuster et al. |
| 2002/0099930 A1 | 7/2002 | Sakamoto et al. |
| 2002/0108103 A1 | 8/2002 | Nevill |
| 2002/0169938 A1 | 11/2002 | Scott et al. |
| 2002/0172199 A1 | 11/2002 | Scott et al. |
| 2003/0014609 A1 | 1/2003 | Kissell |
| 2003/0018685 A1 | 1/2003 | Kalafatis et al. |
| 2003/0033507 A1 | 2/2003 | McGrath |
| 2003/0120892 A1* | 6/2003 | Hum et al. ............... 711/202 |
| 2003/0140245 A1 | 7/2003 | Dahan et al. |
| 2003/0167420 A1 | 9/2003 | Parsons |
| 2003/0172220 A1 | 9/2003 | Hao |
| 2003/0196066 A1 | 10/2003 | Mathews |
| 2003/0236771 A1 | 12/2003 | Becker |
| 2004/0025161 A1 | 2/2004 | Chauvel et al. |
| 2004/0054833 A1 | 3/2004 | Seal et al. |
| 2004/0078778 A1 | 4/2004 | Leymann et al. |
| 2004/0122800 A1 | 6/2004 | Nair et al. |
| 2004/0128448 A1 | 7/2004 | Stark et al. |
| 2004/0153350 A1 | 8/2004 | Kim et al. |
| 2004/0168042 A1 | 8/2004 | Lin |
| 2004/0193831 A1 | 9/2004 | Moyer |
| 2004/0215918 A1 | 10/2004 | Jacobs et al. |
| 2004/0225869 A1 | 11/2004 | Pagni et al. |
| 2004/0268071 A1 | 12/2004 | Khan et al. |
| 2005/0050013 A1 | 3/2005 | Ferlitsch |
| 2005/0055533 A1 | 3/2005 | Kadambi et al. |
| 2005/0086650 A1 | 4/2005 | Yates, Jr. et al. |
| 2005/0097276 A1 | 5/2005 | Lu et al. |
| 2005/0097280 A1 | 5/2005 | Hofstee et al. |
| 2005/0138332 A1 | 6/2005 | Kottapalli et al. |
| 2005/0154831 A1 | 7/2005 | Steely, Jr. et al. |
| 2005/0154867 A1 | 7/2005 | DeWitt, Jr. et al. |
| 2005/0207257 A1 | 9/2005 | Skidmore |
| 2005/0268067 A1 | 12/2005 | Lee et al. |
| 2006/0004984 A1 | 1/2006 | Morris et al. |
| 2006/0010309 A1 | 1/2006 | Chaudhry et al. |
| 2006/0069879 A1 | 3/2006 | Inoue et al. |
| 2006/0069899 A1 | 3/2006 | Schoinas et al. |
| 2006/0095678 A1 | 5/2006 | Bigelow et al. |
| 2006/0149931 A1 | 7/2006 | Haitham et al. |
| 2006/0174228 A1 | 8/2006 | Radhakrishnan et al. |
| 2006/0187945 A1 | 8/2006 | Andersen |
| 2006/0190671 A1 | 8/2006 | Jeddeloh |
| 2006/0195683 A1 | 8/2006 | Kissell |
| 2006/0230223 A1 | 10/2006 | Kruger et al. |
| 2006/0236074 A1* | 10/2006 | Williamson ........ G06F 12/0864 711/216 |
| 2006/0259732 A1 | 11/2006 | Traut et al. |
| 2006/0259744 A1 | 11/2006 | Matthes |
| 2006/0259825 A1 | 11/2006 | Cruickshank et al. |
| 2006/0277398 A1 | 12/2006 | Akkary et al. |
| 2006/0282645 A1 | 12/2006 | Tsien |
| 2006/0288174 A1 | 12/2006 | Nace et al. |
| 2007/0067505 A1 | 3/2007 | Kaniyur et al. |
| 2007/0073996 A1 | 3/2007 | Kruger et al. |
| 2007/0106874 A1 | 5/2007 | Pan et al. |
| 2007/0126756 A1 | 6/2007 | Glasco et al. |
| 2007/0157001 A1 | 7/2007 | Ritzau |
| 2007/0168634 A1 | 7/2007 | Morishita et al. |

(56) References Cited

U.S. PATENT DOCUMENTS

| | | | |
|---|---|---|---|
| 2007/0168643 | A1 | 7/2007 | Hummel et al. |
| 2007/0204137 | A1 | 8/2007 | Tran |
| 2007/0234358 | A1 | 10/2007 | Hattori et al. |
| 2007/0240141 | A1 | 10/2007 | Qin et al. |
| 2008/0141011 | A1 | 6/2008 | Zhang et al. |
| 2008/0172657 | A1 | 7/2008 | Bensal et al. |
| 2008/0263284 | A1 | 10/2008 | da Silva et al. |
| 2009/0019317 | A1 | 1/2009 | Quach et al. |
| 2009/0204785 | A1 | 8/2009 | Yates, Jr. et al. |
| 2009/0327661 | A1 | 12/2009 | Sperber et al. |
| 2009/0327673 | A1 | 12/2009 | Yoshimatsu et al. |
| 2010/0161901 | A9* | 6/2010 | Williamson ........ G06F 12/0864 711/118 |
| 2010/0205402 | A1 | 8/2010 | Henry et al. |
| 2010/0205415 | A1 | 8/2010 | Henry et al. |
| 2010/0217936 | A1 | 8/2010 | Carmichael et al. |
| 2010/0306503 | A1 | 12/2010 | Henry et al. |
| 2011/0078425 | A1* | 3/2011 | Shah et al. ..................... 712/239 |
| 2011/0153307 | A1* | 6/2011 | Winkel et al. .................. 703/26 |
| 2011/0307876 | A1 | 12/2011 | Ottoni et al. |
| 2012/0023359 | A1 | 1/2012 | Edmeades et al. |
| 2012/0089819 | A1 | 4/2012 | Chaudhry et al. |
| 2012/0198157 | A1 | 8/2012 | Abdallah |
| 2013/0198458 | A1* | 8/2013 | Winkel et al. ................. 711/123 |
| 2013/0219370 | A1 | 8/2013 | Beale et al. |
| 2013/0275684 | A1 | 10/2013 | Tuck et al. |
| 2013/0311752 | A1 | 11/2013 | Brauch et al. |
| 2014/0019723 | A1 | 1/2014 | Yamada et al. |
| 2014/0052962 | A1 | 2/2014 | Hertzberg et al. |
| 2014/0082291 | A1 | 3/2014 | Van Zoeren et al. |
| 2014/0136891 | A1 | 5/2014 | Holmer et al. |
| 2014/0189310 | A1 | 7/2014 | Tuck et al. |
| 2014/0281259 | A1 | 9/2014 | Klaiber et al. |
| 2014/0281392 | A1 | 9/2014 | Tuck et al. |
| 2015/0026443 | A1 | 1/2015 | Kumar et al. |

FOREIGN PATENT DOCUMENTS

| | | |
|---|---|---|
| CN | 1629799 | 6/2005 |
| CN | 1682181 | 10/2005 |
| CN | 1823322 | 8/2006 |
| CN | 1831757 | 9/2006 |
| CN | 101042670 | 9/2007 |
| CN | 101110074 | 1/2008 |
| CN | 100378618 C | 4/2008 |
| CN | 102110011 A | 6/2011 |
| CN | 101984403 | 6/2014 |
| DE | 102013218370 | 3/2014 |
| EP | 0671718 | 9/1995 |
| EP | 1557754 A2 | 7/2005 |
| GB | 2287111 | 9/1995 |
| GB | 2404044 | 1/2005 |
| JP | 02288927 | 11/1990 |
| JP | 03054660 | 3/1991 |
| JP | 04182858 | 6/1992 |
| TW | 200401187 | 1/2004 |
| TW | I232372 | 5/2005 |
| TW | 1263938 | 10/2006 |
| TW | 1275938 | 3/2007 |
| TW | 1282230 | 6/2007 |
| TW | 200723111 | 6/2007 |
| TW | I284281 | 7/2007 |
| TW | 200809514 | 2/2008 |
| TW | 1309378 | 5/2009 |
| TW | 1315488 | 10/2009 |
| TW | I315846 | 10/2009 |
| TW | 201106264 | 2/2011 |
| TW | I275938 | 3/2011 |
| TW | 201135460 | 10/2011 |
| TW | 201220183 | 5/2012 |
| WO | 2012103209 | 8/2012 |

OTHER PUBLICATIONS

Rotenberg, Eric et al., "A Trace Cache Microarchitecture and Evaluation," IEEE Transactions on Computers, vol. 48, No. 2, Feb. 1999, 10 pages.

Rotenberg, Eric et al., "Trace Cache: a Low Latency Approach to High Bandwidth Instruction Fetching," <http://people.engr.ncsu.edu/ericro/publications/techreport_MICRO-29_rbs.pdf> Apr. 11, 1996, 48 pages.

Harper et al., (Rapid recovery from transient Faults in the fault tolerant processor with fault-tolerant shared memory) 1990, IEEE, p. 350-359.

Wikipedia, (Page Fault definition), Wikipedia, Mar. 9, 2009, pp. 1-4.

Wikipedia, (CPU Cache definition), Wikipedia, Jan. 26, 2010, pp. 1-16.

Osronline, (The Basics: So what is a Page fault?), http://www.osronline.com/article.cfm?article=222, May 5, 2003, p. 1-2.

Chaudhuri, "The impact of NACKs in shared memory scientific applications", Feb. 2004, IEEE, IEEE Transactions on Parallel and distributed systems vol. 15, No. 2, p. 134-150.

Laibinis, "Formal Development of Reactive Fault Tolerant Systems", Sep. 9, 2005, Springer, Second International Workshop, RISE 2005, p. 234-249.

Wikipedia, Memory Address, Oct. 29, 2010, pp. 1-4, www.wikipedia.com.

Wikipedia, Physical Address, Apr. 17, 2010, pp. 1-2, www.wikipedia.com.

Guelfi et al., (Rapid Integration of Software Engineering Techniques) 2005, Second International Workshop, 9 pages.

Ooi, (Fault Tolerant Architecture in a cache memory control LSI), 1992, IEEE, 507-514.

Oracle, (Oracle 8i Parallel server), 1999, Oracle, Release 2 (8.1.6) 1-216.

Shalan. (Dynamic Memory Management for embedded real-time multiprocessor system on a chip), 2000, ACM. 180-186.

Shalan. (Dynamic Memory Management for embedded real-time multiprocessor system on a chip), 2003, Georgia Inst. of Tech. 1-118.

PC Magazine (Definition of: Page Fault) PCMag.com, Mar. 27, 2009.

Adve, S. et al., "Shared Memory Consistency models: A Turorial", WRL Research Report 95/7, Western Digital Laboratory, Sep. 1995, 32 pages.

Chaudry, S. et al., "High-Performance Throughput Computing," Micro, IEEE 25.3, pp. 32-45, May 2005, 14 pages.

Dehnert, et al., The Transmeta Code Morphing Software: using speculation, recovery, and adaptive retranslation to address real-life challenges, Mar. 23, 2003, IEEE, CGO '03 Proceedings of the international symposium on Code generation and optimization: feedback-directed and runtime optimization, pp. 15-24.

Dundas, J. et al., "Improving Date Cache Performance by Pre-executing Instructions Under a Cache Miss", Proceedings of the 1997 International Conference on Supercomputing, Jul. 1997, 9 pages.

Ekman, M. et al., "Instruction Categorization for Runahead Operation", U.S. Appl. No. 13/708,544, filed Dec. 7, 2012, 32 Pages.

Holmer, B., et al., "Managing Potentially Invalid Results During Runahead", U.S. Appl. No. 13/677,085, filed Nov. 14, 2012, 29 pages.

Mutlu, O. et al. "Runahead Execution: An Alternative to Very large Instruction Windows for Out-of-order Processors," This paper appears in: "High-Performance Computer Architecture," Feb. 8-12, 2003, 13 pages.

Nvidia Corp. Akquirierung spekulativer Genehmigung jur gemeinsam genutzten Speicher, Mar. 20, 2014, SW102013218370 A1, German Patent Office, All Pages.

Rozas, Guillermo J. et al., "Queued Instruction Re-Dispatch After Runahead," U.S. Appl. No. 13/730,407, filed Dec. 28, 2012, 36 pages.

Rozas, J. et al., "Lazy Runahead Operation for a Microprocessor", U.S. Appl. No. 13/708,645, filed Dec. 7, 2012, 32 pages.

(56) References Cited

OTHER PUBLICATIONS

Wikipedia article, "Instruction Prefetch," https://en.wikipedia.org/wiki/Instruction_prefetch, downloaded May 23, 2016.
Wikipedia article, "x86," https://en.wikipedia.org/wiki/X86, downloaded May 23, 2016.

* cited by examiner

TRANSLATION ADDRESS CACHE FOR A MICROPROCESSOR

BACKGROUND

Architectural-level instructions for microprocessors may be translated between an instruction set architecture (ISA) and a native architecture. In some microprocessors, software optimizations of the ISA instructions may execute comparatively more efficiently than the ISA instructions upon which those software optimizations were based. Some past approaches chained software optimizations to pass control from one software optimization to another. However, such approaches may be challenged by indirectly-branched processes because it may be difficult to determine the target of an indirect branch.

DETAILED DESCRIPTION

Figure 1:
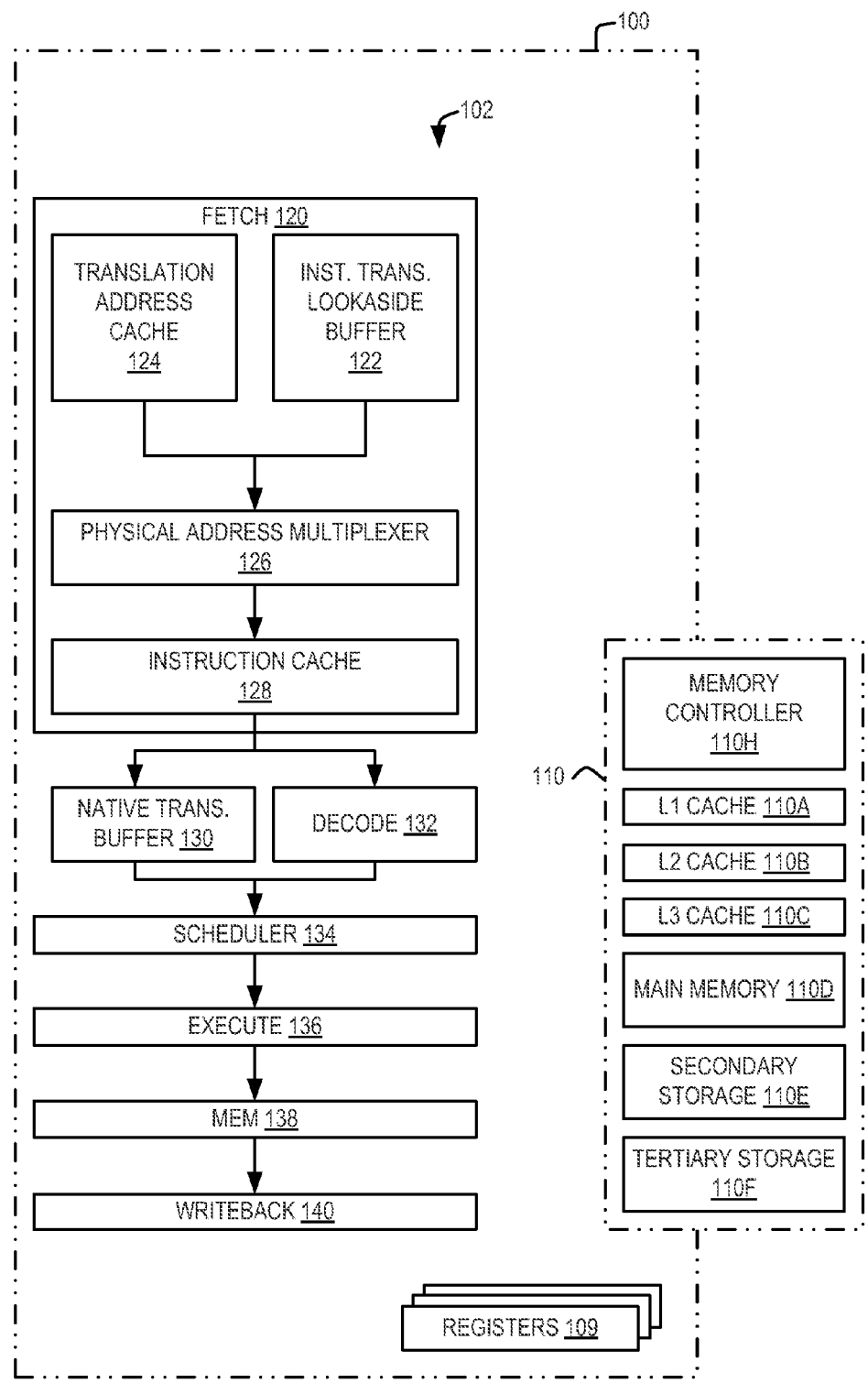
FIG. 1 schematically shows a microprocessor according to an embodiment of the present disclosure.

In modern microprocessors, architectural-level instructions may be translated between a source instruction set architecture (ISA), such as an advanced RISC machine (ARM) architecture or an x86 architecture, and an alternate ISA that achieves the same observable functionality as the source. For example, a set of one or more instructions of a source ISA may be translated into one or more micro-operations of a native architecture that perform the same function as the source ISA instruction. In some settings, the native micro-operation(s) may provide enhanced or optimized performance relative to the source ISA instruction.

Some past approaches attempted to chain software optimizations of source instructions so that control passed from one software optimization to another software optimization via direct native branches. However, such approaches may be challenged by branched processes. Because the branch source may be dynamic during program execution, chain-wise handoff between software optimizations may not be feasible. For example, should an indirect branch occur, the indeterminate target of the branch may make it difficult to ascertain which software optimization should be retrieved at the time the optimization is created. Consequently, the microprocessor may stall while the branch and software optimization for that branch are determined from potentially thousands of candidate optimizations.

Accordingly, various embodiments are disclosed herein that are related to fetching source information and alternate versions of the source information that achieve the same observable functionality (referred to herein as the same functionality) of the source information within an acceptable tolerance (e.g., within an acceptable tolerance of architecturally observable effect). It will be appreciated that virtually any suitable source information and any alternate version thereof may be employed without departing from the scope of the present disclosure. In some embodiments, a source may include an instruction, such as an instruction for an ISA architecture. In addition to or instead of instructions, the source information may include source data, and the alternate version may include an alternative form or version of the source data. Likewise, it will be appreciated that any suitable manner of transforming a source into an alternate version thereof (e.g., a software approach and/or a hardware approach) may be contemplated as being within the scope of the present disclosure. For illustrative purposes, the descriptions and figures presented herein refer to source instructions and translations of the source instructions, respectively, as source information and alternate versions of the source information, though such embodiments are not limiting.

One example method includes, upon being directed to retrieve an instruction, hashing an address for that instruction so that it may be determined if there exists an alternate version for that instruction. The hashing is performed to determine whether there exists an alternate version of the instruction which achieves the same functionality, such as a native translation (e.g., translations between a source instruction set architecture and a native micro-operation set architecture for various instructions that may be fetched for execution by the microprocessor). The example method further includes, if hashing results in a determination that such an alternate version exists, aborting retrieving of the instruction and retrieving and executing the alternate version.

The discussion herein will frequently refer to "retrieving" an instruction and then aborting that retrieval if certain conditions exist. In some embodiments, "retrieving" an instruction may include fetching an instruction. Further, when such aborting occurs, the retrieval process is terminated. The termination typically occurs prior to completion of the retrieval process. For example, in one scenario, aborting retrieval may occur while the physical address for an instruction is being retrieved. In another scenario, aborting retrieval may occur after the physical address for an instruction is retrieved but before the instruction is retrieved from memory. Aborting retrieval prior to completion of the retrieval process may save time spent accessing and retrieving the source from memory. It will be appreciated that, as used herein, retrieval is not limited to fetch scenarios, where fetch is typically completed prior to decode. For example, an instruction may be retrieved but aborted during decode, before decode, or at any suitable point.

A wide range of possibilities exist for mapping and translating between source information and translated versions of that information. By determining whether the alternate version exists and aborting retrieving the instruction, for example, an ISA instruction, if the alternate version does exist, the microprocessor may offer enhanced performance relative to microprocessors that decode source ISA instructions by avoiding decode operations. Additional performance enhancement may be realized in settings where the alternate version provides optimized performance by changes to the operations which allow the alternate version to proceed through execution more quickly than the source ISA instruction.

FIG. 1 schematically depicts an embodiment of a microprocessor 100 that may be employed in connection with the systems and methods described herein. Microprocessor 100 may include processor registers 109. Further, microprocessor 100 may include and/or may communicate with a memory hierarchy 110, which may include an L1 processor cache 110A, an L2 processor cache 110B, an L3 processor cache 110C, main memory 110D (e.g., one or more DRAM chips), secondary storage 110E (e.g., magnetic and/or optical storage units) and/or tertiary storage 110F (e.g., a tape farm). It will be understood that the example memory/storage components are listed in increasing order of access time and capacity, though there are possible exceptions.

A memory controller 110H may be used to handle the protocol and provide the signal interface required of main memory 110D and to schedule memory accesses. Memory controller 110H can be implemented on the processor die or on a separate die. It is to be understood that the memory hierarchy provided above is non-limiting and other memory hierarchies may be used without departing from the scope of this disclosure.

Microprocessor 100 also includes a pipeline, illustrated in simplified form in FIG. 1 as pipeline 102. Pipelining may allow more than one instruction to be in different stages of retrieval and execution concurrently. Put another way, a set of instructions may be passed through various stages (including fetch, decode, execution, and writeback stages, among others) included in pipeline 102 while another instruction and/or data is retrieved from memory and acted upon by pipeline 102. Thus, downstream stages in pipeline 102 may be utilized while upstream stages are waiting for memory to return instructions and/or data, and so on. This approach may potentially accelerate instruction and data processing by the microprocessor relative to approaches that retrieve and execute instructions and/or data in an individual, serial manner.

As shown in FIG. 1, example pipeline 102 includes fetch logic 120, a native translation buffer 130, decode logic 132, scheduling logic 134, execution logic 136, mem logic 138, and writeback logic 140. Fetch logic 120 fetches a selected instruction from an instruction cache for execution. In the example shown in FIG. 1, fetch logic 120 includes an instruction translation lookaside buffer 122 for translating a linear address of the selected instruction into a physical address for the instruction to be fetched for execution. As used herein, a linear address for an instruction refers to an address that is translated/remapped by a page table to a physical address associated with a location in memory where the instruction is stored. In some embodiments, the linear address may include directory, table, and/or offset entries that may identify page directory, page table, and/or page frame locations in a page table where the physical address for the instruction may be found.

Instruction translation lookaside buffer 122 may perform virtually any suitable manner of translating linear addresses into physical addresses for those instructions. For example, in some embodiments, instruction translation lookaside buffer 122 may include content-addressable memory that stores a portion of a page table that maps linear addresses for instructions to physical addresses for those instructions.

Fetch logic 120 also determines whether a native translation for the selected instruction exists. If such a native translation exists, the system aborts the instruction fetch and sends the native translation for execution instead. In the embodiment depicted in FIG. 1, fetch logic 120 includes a translation address cache 124 for storing the addresses of native translations.

Figure 2:
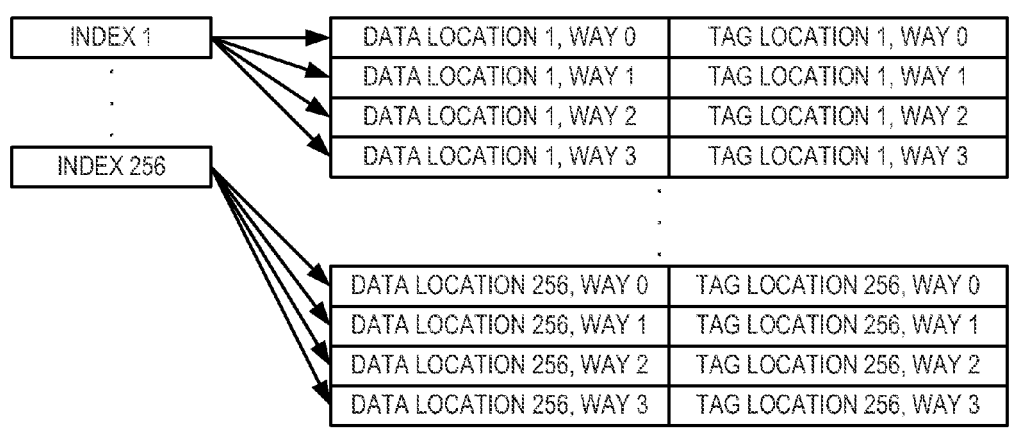
FIG. 2 schematically shows a translation address cache according to an embodiment of the present disclosure.

Almost any suitable data storage architecture and logic may be used for translation address cache 124. For example, FIG. 2 schematically shows an embodiment of a 4-way associative cache 200 employed as a translation address cache. In the embodiment shown in FIG. 2, 1024 translation address entries may be stored in any of four ways, depending on the address scheme selected, each way including 256 data locations. However, it will be appreciated that some embodiments may have fewer data ways and/or data locations while other embodiments may include more data ways and/or data locations without departing from the scope of the present disclosure.

Continuing with FIG. 1, fetch logic 120 includes a physical address multiplexer 126 that multiplexes physical addresses received from instruction translation lookaside buffer 122 and translation address cache 124 and distributes them to an instruction cache 128. In turn, instruction cache 128 retrieves instructions and native translations stored for execution by microprocessor 100 with reference to physical addresses for those instructions and native translations. If fetch logic 120 determines that a native translation exists for a selected instruction, the native translation is retrieved from instruction cache 128 and may be forwarded to an optional native translation buffer 130 in preparation for eventual distribution to scheduling logic 134. Alternatively, if fetch logic 120 determines that the native translation does not exist for the selected instruction, the selected instruction is retrieved from instruction cache 128 and is forwarded to decode logic 132. Decode logic 132 decodes the selected instruction, for example by parsing opcodes, operands, and addressing modes, and generates a decoded set of one or more native instructions or micro-operations in preparation for distribution to scheduling logic 134. Scheduling logic 134 schedules the native translations and decoded instructions for execution by execution logic 136.

The embodiment depicted in FIG. 1 illustrates instruction cache 128 as including a physically-indexed-physically-tagged (PIPT) instruction cache, so that an address for native translation may be retrieved from translation address cache 124 concurrent with retrieval of the source address from instruction translation lookaside buffer 122. However, it will be understood that embodiments according to the present disclosure may be employed with any suitable instruction cache 128. For example, in some embodiments, instruction cache 128 may include a linear-indexed-physically-tagged (LIPT) instruction cache. In such embodiments, fetch logic may concurrently retrieve an address for a source from an instruction translation lookaside buffer, an address for a native translation from a translation address cache, and the source from the LIPT instruction cache. If there is a native translation available, the instruction may be discarded and the native translation may be retrieved from the LIPT cache for execution based on the address for the native translation. If there is no native translation version available, the instruction may be decoded and then executed.

Pipeline 102 may also include mem logic 138 for performing load and/or store operations and writeback logic 140 for writing the result of operations to an appropriate location such as register 109. Upon writeback, the microprocessor enters a state modified by the instruction or instructions, so that the result of the operations leading to the committed state may not be undone.

It should be understood that the above stages shown in pipeline 102 are illustrative of a typical RISC implementation, and are not meant to be limiting. For example, in some embodiments, VLIW-techniques may be implemented upstream of certain pipelined stages. In some other embodiments, the scheduling logic may be included in the fetch logic and/or the decode logic of the microprocessor. More generally a microprocessor may include fetch, decode, and execution logic, with mem and write back functionality being carried out by the execution logic. The present disclosure is equally applicable to these and other microprocessor implementations.

In the described examples, instructions may be fetched and executed one at a time or more than one at a time, possibly requiring multiple clock cycles. During this time, significant parts of the data path may be unused. In addition to or instead of single instruction fetching, pre-fetch methods may be used to improve performance and avoid latency bottlenecks associated with read and store operations (i.e., the reading of instructions and loading such instructions into processor registers and/or execution queues). Accordingly, it will be appreciated that virtually any suitable manner of fetching, scheduling, and dispatching instructions may be used without departing from the scope of the present disclosure.

Figure 3A:
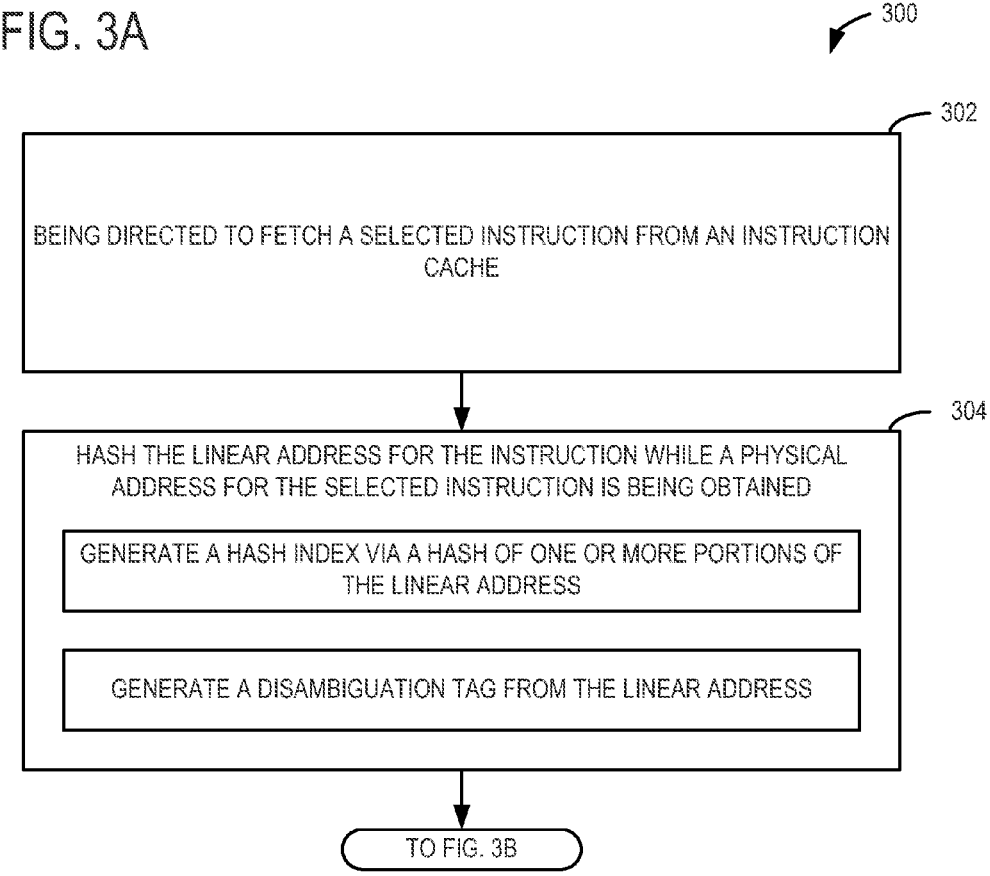
FIG. 3A shows a portion of a flowchart for a method of fetching an instruction from an instruction cache and determining whether an alternate version for the instruction is stored in the instruction cache according to an embodiment of the present disclosure.
Figure 3B:
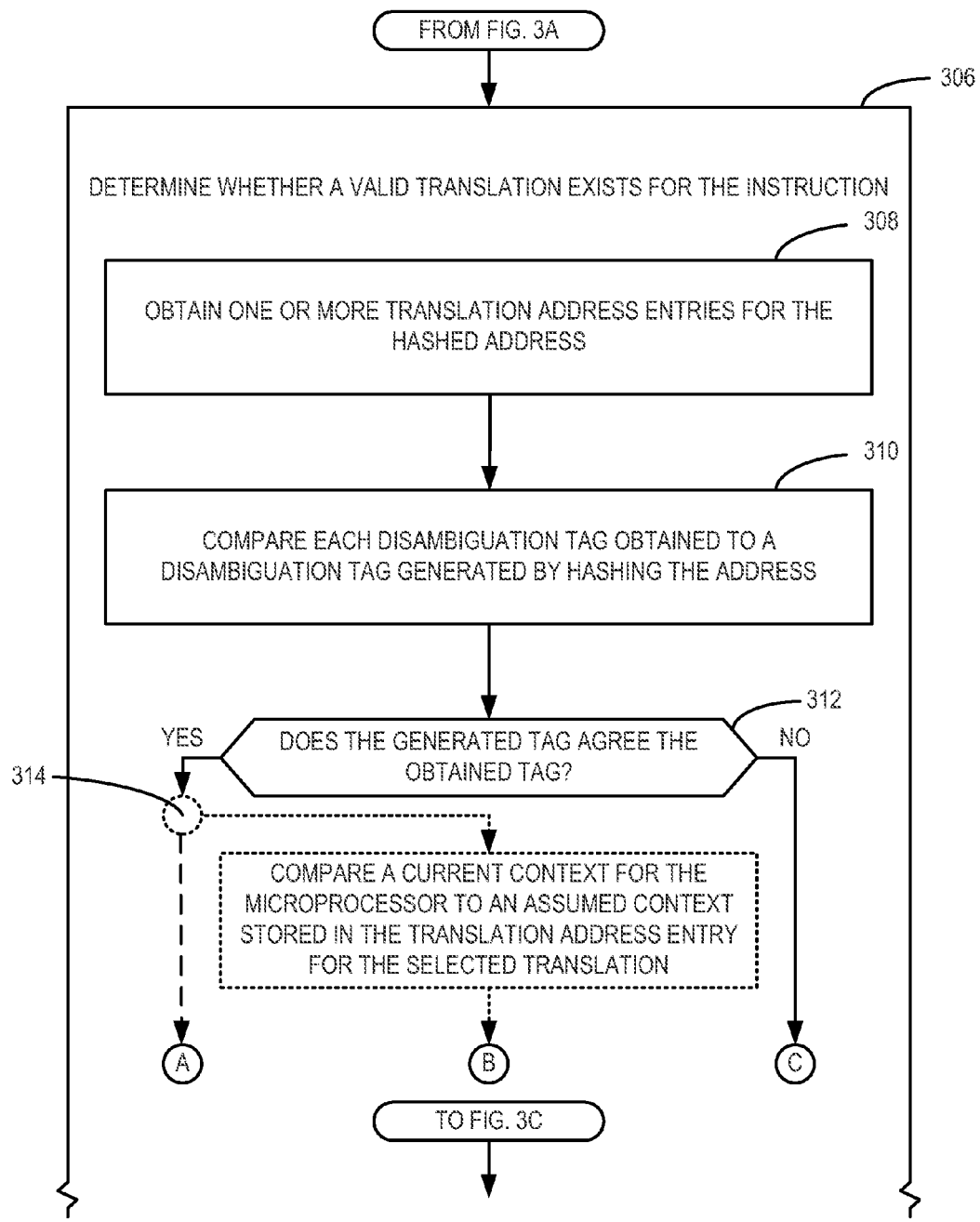
FIG. 3B shows another portion of the flowchart illustrated in FIG. 3A.
Figure 3C:
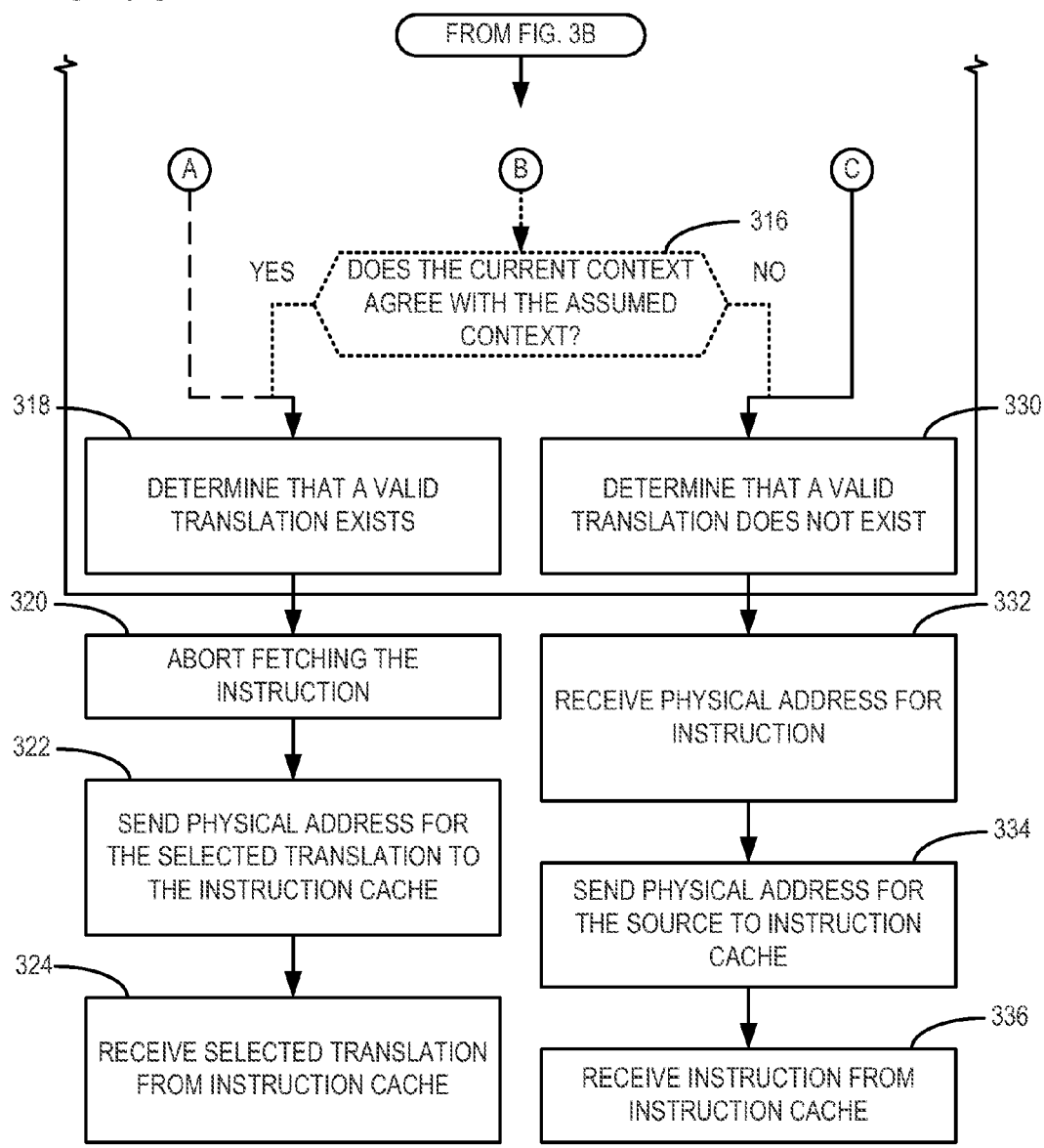
FIG. 3C shows another portion of the flowchart illustrated in FIGS. 3A and 3B.

FIGS. 3A-C schematically show an embodiment of a method 300 for fetching a selected instruction from an instruction cache and determining whether a native translation for the selected instruction is stored in the instruction cache. While method 300 is described with respect to determining whether a native translation is available for an instruction, it will be understood that this scenario is merely an illustration of fetching an instruction and determining whether there exists an alternative version that achieves the same functionality as the instruction, and that method 300 is not limited to the example or setting described below. Thus, it will be appreciated that the processes described in method 300 are arranged and described for illustrative purposes and are not intended to be limiting. In some embodiments, the methods described herein may include additional or alternative processes, while in some embodiments, the methods described herein may include some processes that may be reordered or omitted without departing from the scope of the present disclosure. Further, it will be appreciated that the methods described herein may be performed using any suitable hardware including the hardware described herein.

Turning to FIG. 3A, method 300 includes, at 302, being directed to fetch a selected instruction from an instruction cache. In some embodiments, the fetch process may be directed to retrieve an instruction with reference to a linear address for the selected instruction. For example, a selected instruction may be fetched from the instruction cache responsive to a branch to a target instruction pointer, such as a branch that may result from a branch predictor or from a branch validation point in a microprocessor pipeline. It will be understood that process 302 may include looking up a physical address for the selection in an instruction translation lookaside buffer as described in more detail below.

In some embodiments, fetching the selected instruction may include fetching a physical address for the selected instruction from an instruction translation lookaside buffer. In such embodiments, a linear address for the selected instruction may be received upon direction to the target instruction pointer. In turn, the linear address may be translated into a physical address for the selected instruction by the instruction translation lookaside buffer by searching, with reference to the linear address, physical addresses stored in the instruction lookaside buffer. If the search does not hit upon the physical address for the selected instruction, the physical address may be determined via a page walk or via lookup in a higher-level translation lookaside buffer. Regardless of how the physical address is determined, once the physical address for the selected instruction is determined, it is provided to an instruction cache so that the selected instruction may be obtained.

At 304, method 300 comprises hashing the linear address for the selected instruction to generate a hash index from the linear address while the physical address for the selected instruction is being obtained. The hash index may then be used when determining whether a native translation for the selected instruction exists, as described in more detail below.

For example, direction to the target instruction pointer may cause the linear address to be hashed concurrently (within a suitable tolerance) with distribution of the linear address to an instruction translation lookaside buffer. However, it will be appreciated that any suitable manner of performing the hash may be employed at any suitable position within the process flow without departing from the scope of the present disclosure.

In some embodiments, the linear address may be hashed by a suitable hardware structure included in the microprocessor. For example, the linear address may be hashed by the fetch logic and/or the native translation address cache, though virtually any suitable hardware structure may be used to hash the linear address without departing from the scope of the present disclosure.

Figure 4:
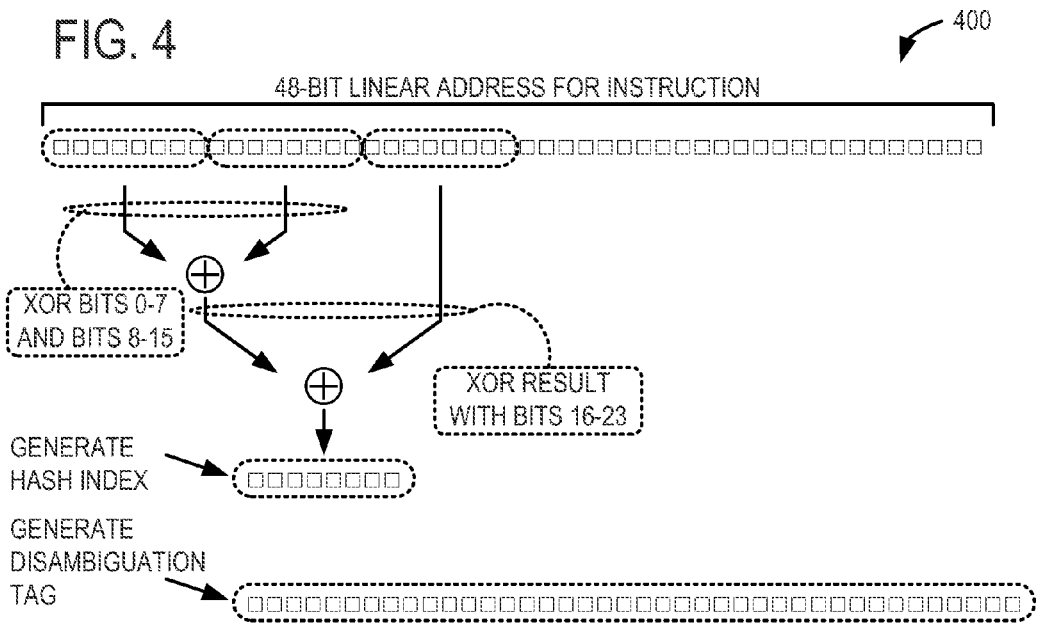
FIG. 4 schematically shows a method of hashing a linear address for an instruction to generate a hash index and a disambiguation tag for the linear address according to an embodiment of the present disclosure.

A wide variety of hash techniques may be employed. For example, in some embodiments, the hash index may be generated using an XOR hash function. A hash index can also be generated by hashing a plurality of portions of the linear address. In some other embodiments, a hash index may be generated by using a single portion of the linear address. FIG. 4 schematically shows a method of hashing a 48-bit linear address for an instruction to generate an 8-bit hash index using an XOR hash function. In the example shown in FIG. 4, the result of XOR'ing bits 0-7 with bits 8-15 is XOR'd with bits 16-23 to generate the 8-bit hash index.

In some embodiments, a disambiguation tag may be generated when the linear address is hashed. The disambiguation tag may be used to discriminate various translation address entries for alternate versions (for example, address entries for native translations of instructions) from one another when more than one translation address entry in the translation address cache has the same index value. Thus, in some embodiments, the disambiguation tag may be used to disambiguate a plurality of translation address entries having identical translation address indices stored in the translation address cache. For example, FIG. 4 schematically shows a method of generating a 40-bit disambiguation tag for the 48-bit linear address from portions of the linear address not formed into the 8-bit hash index. Thus, bits not used to generate the hash tag are may be used to generate the disambiguation tag in some embodiments. In the example shown in FIG. 4, bits 8-48 are used to form the disambiguation tag. However, any suitable manner of generating the disambiguation tag may be employed without departing from the scope of the present disclosure.

While the discussion above relates to hashing a linear address to obtain one or more translation address entries from a translation address cache, so that the translation address entries are indexed according to linear addresses, it will be appreciated that the translation address cache may be indexed according to any suitable address. For example, in some embodiments, a suitably-configured translation address cache may be indexed according to physical addresses. Indexing a translation address cache according to physical addresses may save space within the translation address cache when two processes map to a shared library at different linear addresses. In some of such scenarios, only one version of the shared library may be physically loaded into memory. By indexing according to a physical address, a shared mapping may lead to a single entry being obtained, while an unshared mapping may lead to different entries being obtained.

Turning to FIG. 3B, example method 300 includes, at 306, determining whether a valid native translation exists for the selected source instruction being fetched. In some embodiments, determination of whether a valid native translation exists occurs concurrently (within a suitable tolerance) with determination of the physical address for the selected instruction, with retrieval of the address from an instruction translation lookaside buffer. In such embodiments, if it is determined that a valid native translation does not exist, concurrent processing at one or more of these stages may allow the physical address fetch to continue without penalty. However, it will be understood that the determination need not be concurrent in some embodiments.

Regardless of when the validity determination is performed, if it is determined that a valid native translation exists, fetching the source instruction may be aborted, by aborting retrieval of the physical address for the source instruction, for example. In turn, processing efficiency may be enhanced by avoiding decode steps and by permitting use of the alternate version.

In the embodiment shown in FIG. 3B, determination of whether a valid native translation exists includes, at 308, obtaining one or more translation address entries for the hashed address and, at 310, comparing a disambiguation tag generated during the hashing process with one or more translation address disambiguation tags obtained using each of the translation addresses obtained.

A translation address entry stores a physical address where a native translation is stored. Translation address entries may be looked up according to a translation address index associated therewith. For example, a hash index generated when hashing an address may be used to look up a particular translation address index in a translation address cache.

In some embodiments, more than one translation address entry may be obtained via lookup of a particular translation address index. For example, a hashed address used to look up a translation address index for a 4-way associative cache may result in the retrieval of up to four translation address entries. In such embodiments, each translation address entry has a respective translation address disambiguation tag that disambiguates that entry from other entries having identical translation address indices. Comparing the disambiguation tag generated by hashing the address with disambiguation tags retrieved with respective translation address entries may determine whether any of the entries obtained represents a physical address for a valid native translation. In some embodiments, comparison of the disambiguation tags may include a comparison of a valid bit. In such embodiments, agreement between tags being compared may be found only if the valid bit is set to a preselected value, such as a value of 1.

Figure 5:
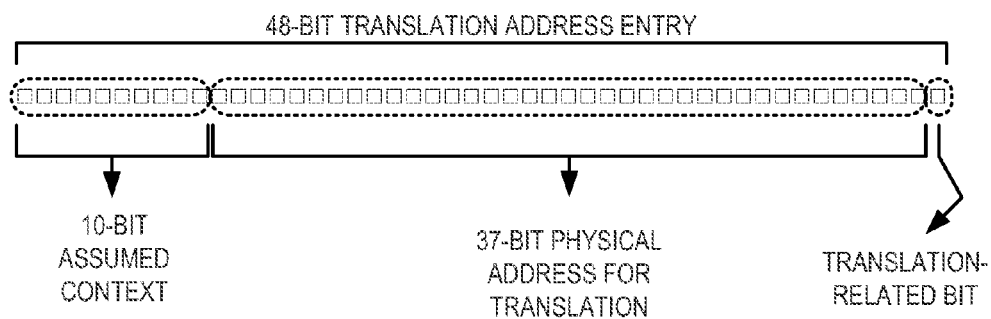
FIG. 5 schematically shows a translation address cache entry according to an embodiment of the present disclosure.

In some embodiments, a translation address entry may include bits representative of the physical address for a native translation and bits representative of an assumed context for the native translation. Additionally, in some embodiments, a translation address entry may include one or more other bits related to the translation and/or aspects of the translation. FIG. 5 schematically shows an embodiment of a translation address entry that includes physical address bits, assumed context bits, and a translation-related bit.

Continuing with FIG. 3B, method 300 comprises, at 312, determining whether the disambiguation tag generated when hashing the address agrees with any of the disambiguation tags obtained with the translation address entries. If the disambiguation tags do not agree, method 300 advances to 330, depicted in FIG. 3C. If a disambiguation tag obtained from the translation address cache agrees with the disambiguation tag generated by the hashing, the agreement indicates that a valid disambiguation tag was obtained. In some embodiments, the existence of a valid disambiguation tag may lead to a determination that a valid translation exists. However, in some embodiments, the existence of a valid disambiguation tag alone may not support a conclusion that the entry associated with that tag includes a valid native translation. Thus, method 300 may branch at 314, discussed in more detail below, or alternatively may continue to 318, depicted in FIG. 3C.

As introduced above, in some embodiments, a translation address entry may include an assumed context for the native translation. As used herein, a current context describes a current working state of the microprocessor and an assumed context describes a state of the microprocessor for which the native translation is valid. Thus, in some embodiments, even if a valid disambiguation tag for an entry is identified, the entry associated with that disambiguation tag may not include a valid native translation for the current context. In some examples, issuing a native translation for which the current context and assumed context do not agree may cause an execution error or hazard.

It will be appreciated that the context may be included in any suitable part of the translation address entry and/or the translation address. In the example shown in FIG. 5, the context bits are illustrated as being included in the translation address entry. In such embodiments, the context optionally may be compared as shown at 316 of FIG. 3C. Thus, instead of advancing to 318, method 300 optionally may branch at 314, comparing a current context for the microprocessor to an assumed context stored in the translation address entry. Turning to FIG. 3C, in such embodiments, method 300 may comprise, at 316, determining whether the current context agrees with the assumed context. In some embodiments, the current context may be compared with the assumed context to determine agreement. In one example scenario, agreement may be found if the assumed and the current contexts agree based on a one-to-one comparison. If the contexts agree, method 300 continues to 318, where method 300 makes a determination that a valid native translation exists. If the contexts do not agree, method 300 advances to 330, where method 300 makes a determination that a valid native translation does not exist.

Additionally or alternatively, in some embodiments, bits for the assumed context may be included in the translation address, such as in the disambiguation tag and/or the hash. In such embodiments, inclusion of the assumed context in one or more parts of the address may allow concurrent storage of two or more entries with different contexts and otherwise identical linear addresses within the translation address cache. It will be appreciated that implementation of such embodiments may depend upon application-specific considerations. For example, in some embodiments where set associativity is low, such as in a scenario where the addresses are directly mapped, the assumed context may be included in the hash may avoid a conflict miss. For example, the assumed context may be XOR'ed into the hash during hashing. In some other embodiments, such as those where a cycle time for hashing additional bits affects processing time more than a time for processing a comparatively wider disambiguation tag, the assumed context may be added to the disambiguation tag to avoid potential processing delays. As an example, the assumed context may be appended to the disambiguation tag. In still other embodiments, the assumed context may be included in the hash and in the disambiguation tag.

Once it is determined that a valid native translation exists, method 300 comprises, at 320, aborting fetching the instruction. When aborting occurs, the fetch process is terminated. While the termination may occur after fetch of the instruction, in some embodiments the termination may occur prior to completion of the fetch process. For example, in embodiments where fetching the instruction includes retrieving the physical address for an instruction from an instruction translation lookaside buffer, aborting fetching the instruction may include aborting retrieving the physical address from the instruction translation lookaside buffer.

At 322, method 300 includes sending the physical address for the native translation to the instruction cache, and, at 324, receiving the selected native translation from the instruction cache. In some embodiments, once the selected native translation is received from the instruction cache, it may be forwarded to a native translation buffer in preparation for eventual distribution to scheduling logic where it is to be scheduled for execution.

Alternatively, in the embodiment shown in FIG. 3C, if a valid native translation does not exist, method 300 comprises, at 332, allowing the fetch from the instruction cache to complete. For example, in embodiments where fetching the instruction includes retrieving the physical address from an instruction translation lookaside buffer, method 300 may include, at 334, after receiving the physical address for the instruction from the instruction translation lookaside buffer, sending the physical address for the instruction to the instruction cache so that the instruction may be obtained from the instruction cache at 336.

Consequently, by determining the existence of alternate versions for the source material, (in the examples described above, native translations that provide the same functionality as the source instructions) while fetching the source material, the methods described herein may offer enhanced processing relative to processing based on the source material alone. Further, by utilizing hardware structures to perform the concurrent determination, the methods described herein may be comparatively more efficient relative to software optimization-based schemes, particularly in branched processing scenarios.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples as understood by those of ordinary skill in the art. Such other examples are intended to be within the scope of the claims.

The invention claimed is:

1. A microprocessor comprising fetch logic operative to:
fetch an instruction;
generate a hash index from one or more portions of an address for the instruction;
generate a disambiguation tag from at least one other portion of the address for the instruction;
determine whether an alternate version exists for the instruction based on the hash index and the disambiguation tag, including:
referencing a translation address index in a translation address cache of the microprocessor according to the hash index,
comparing a current context for the microprocessor with an assumed context, the current context describing a current working state of the microprocessor, the assumed context describing a state of the microprocessor for which the alternate version is valid, and
determining that an alternative version of the instruction exists when the current context agrees with the assumed context,
wherein the alternate version is a translation of the instruction, and the alternative version comprises a set of two or more micro-operations; and
in response to a determination that the alternative version exists,
abort the fetch of the instruction; and
retrieve the alternate version for execution by the microprocessor, including retrieving a physical address for the alternate version from the translation address cache.

2. The microprocessor of claim 1, wherein the fetch logic is further operative to generate the hash index or the disambiguation tag while the instruction is being fetched.

3. The microprocessor of claim 1, wherein the fetch logic is further operative to:
obtain one or more translation address entries stored in the translation address cache according to the translation address index;
compare the disambiguation tag with a second disambiguation tag associated with at least one of the translation address entries; and
determine that an alternative version of the instruction exists when the disambiguation tag agrees with the second disambiguation tag.

4. The microprocessor of claim 1, wherein the fetch logic is further operative to:
send the physical address for the alternate version to an instruction cache to obtain the alternate version from the instruction cache; and
send the alternate version obtained from the instruction cache to a scheduling logic that schedules the alternate version for execution.

5. The microprocessor of claim 1, further comprising a translation address cache configured to store, for each alternate version stored within the translation address cache, a translation address entry comprising a physical address for the alternate version and an assumed context for describing a state of the microprocessor for which the alternate version is valid.

6. The microprocessor of claim 1, further comprising a linear-indexed-physically-tagged instruction cache or a physically-indexed-physically-tagged instruction cache.

7. The microprocessor of claim 1, wherein the address for the instruction is a linear address, and the fetch logic is further operative to retrieve a physical address for the instruction from an instruction translation lookaside buffer with reference to the linear address for the instruction.

8. The microprocessor of claim 7, wherein the fetch logic is further operative to:
in response to a determination that the alternate version does not exist, send the physical address for the instruction to an instruction cache to obtain the instruction from the instruction cache;

send the instruction to a decode logic to generate a decoded instruction; and
send the decoded instruction to scheduling logic to schedule the decoded instruction for execution.

9. A microprocessor, comprising:
an instruction cache that stores one or more instructions for execution by the microprocessor;
scheduling logic that schedules execution of at least one of the one or more instructions;
a translation address cache that stores at least an address for an alternate version of at least one of the one or more instructions, the alternate version being a translation of the at least one of the one or more instructions and the alternative version comprises a set of two or more micro-operations, the translation address cache being configured to store, for a selected translation address index, a plurality of translation address entries, each translation address entry comprising a physical address for a respective alternate version, and each translation address entry further comprising an assumed context for describing a state of the microprocessor for which a respective alternate version is valid; and
fetch logic operative to:
fetch a selected instruction from the instruction cache,
generate a hash index and a disambiguation tag for the selected instruction,
determine whether an address of an alternate version of the selected instruction exists in the translation address cache, and in response to a determination that the address for the alternate version of the selected instruction exists in the translation address cache,
abort fetching or decoding the selected instruction, and
obtain the alternate version of the selected instruction from the instruction cache based upon the address of the alternate version of the selected instruction, and send the alternate version of the selected instruction to the scheduling logic.

10. The microprocessor of claim 9, further comprising:
an instruction translation lookaside buffer that translates a physical address for the selected instruction stored in the instruction cache according to a linear address for that instruction.

11. The microprocessor of claim 9, further comprising a decode logic that sends a decoded version of the selected instruction to the scheduling logic in response to a determination that an alternate version of the selected instruction does not exist.

12. The microprocessor of claim 9, wherein the selected instruction is associated with a linear address comprising 48 bits, the hash index comprises 8 bits and the disambiguation tag comprises 40 bits.

13. The microprocessor of claim 9, the translation address cache comprising 1024 translation address entries distributed among at least 4 ways, each way comprising 256 data locations.

14. A method for determining whether an alternative version of an instruction is available for execution by a microprocessor, the method comprising:
fetching a physical address for an instruction from an instruction translation lookaside buffer with reference to a linear address for the instruction;
while fetching the physical address from the instruction translation lookaside buffer, determining whether a physical address for an alternative version of the instruction is stored in a translation address cache by performing the steps comprising:
hashing one or more portions of the linear address to obtain a hash index and a disambiguation tag,
obtaining one or more translation address entries stored in the translation address cache according to the hash index, and
comparing the disambiguation tag with each of the one or more translation address entries obtained,
identifying an assumed context for the alternative version from the translation address cache based on the hash index and the disambiguation tag;
comparing a current context for the microprocessor with the assumed context; and
in response to the current context agreeing with the assumed context, identifying the physical address of the alternative version stored in a translation address entry of the translation cache associated with the hash index;
wherein the alternate version is a translation of the instruction, and the alternative version comprises a set of two or more micro-operations;
in response to a determination that the physical address associated with the alternative version is stored in the translation address cache, aborting the fetching of the physical address for the instruction from the instruction translation lookaside buffer; and
in response to a determination that the physical address associated with the alternative version is not stored in the translation address cache, sending the physical address for the instruction to the instruction cache to obtain the instruction from the instruction cache, sending the instruction to a decode logic that generates a decoded instruction, and sending the decoded instruction to a scheduling logic that schedules the decoded instruction for execution.

* * * * *